United States Patent [19]

Suzuki et al.

[11] 3,720,624
[45] March 13, 1973

[54] CATIONIC SURFACE ACTIVE SUBSTANCE, METHOD FOR MANUFACTURING SAME

[75] Inventors: Shigeyuki Suzuki, Sagamihara-shi, Kanagawa-ken; Kotara Kumakoto, Setagaya-ku, Tokyo-to; Isamu Kaneda, Edogawa-ku, Tokyo-to; Shoushiro Sakai, Chigasaki-shi, Kanagawa-ken, all of Japan

[73] Assignee: Kurita Water Industries Limited, Koraibashi, Higashi-ku, Osaka-shi, Osaka-fu, Japan

[22] Filed: July 17, 1970

[21] Appl. No.: 55,961

[30] Foreign Application Priority Data

July 18, 1969 Japan..................................44/56559

[52] U.S. Cl. ................ 252/357, 210/52, 260/96.5 T, 260/290 HL, 260/567.6 R
[51] Int. Cl. ......................... B01f 17/16, B01f 17/18
[58] Field of Search .................252/357; 260/290 HL

[56] References Cited

UNITED STATES PATENTS

| | | | |
|---|---|---|---|
| 2,806,019 | 9/1957 | Lane.................................252/357 X |
| 2,051,947 | 8/1936 | Hunsdiecker et al.................252/357 |
| 2,063,934 | 12/1936 | Keller et al. .......................252/357 X |
| 3,265,734 | 8/1966 | Kraiman et al. ..................252/357 X |

*Primary Examiner*—Richard D. Lovering
*Attorney*—Wenderoth, Lind & Ponack

[57] ABSTRACT

Water soluble substance having cationic surface active properties manufactured by subjecting polycyclic condensation compounds (viz, a mixture of high aromatic hydrogen compounds selected from the group consisting of tarry, pitchy and resinous substances obtained by heat-treating petroleum type hydrocarbons, coal tar or coal pitch at a temperature range of 700°C. to 2000°C. for a time period from one-tenth second to 1/1000 second) to halomethylation and quaternization with a thiourea, trialkylamine or pyridine. The substance is useful for flocculation of solid particles suspending in water or organic substances dissolved in water.

4 Claims, No Drawings

CATIONIC SURFACE ACTIVE SUBSTANCE, METHOD FOR MANUFACTURING SAME

BACKGROUND OF THE INVENTION

This invention relates to a water-soluble substance having cationic surface active properties, to a method of producing the same, and to a new use of the compound as a flocculating agent. More particularly, the purpose of the present invention is three-fold, i.e., it is directed to provide a water-soluble substance having cationic surface active properties; a method of producing the same by subjecting a mixture of organic compounds containing therein as its principal constituent polycyclic condensation compounds of more than two rings having or not having alkyl radicals to the first treatment of halomethylation, and then to a reaction with thioureas, tertiary amines, or pyridine derivatives; and a new use of such water-soluble cationic surface active substance for flocculation of organic and inorganic solid substances suspending in water or organic substance dissolved in water.

It has heretofore been known to produce a cationic surface active agent by introducing chloromethyl group into the nucleus of a monocyclic compound such as alkylbenzene, thereafter causing this halomethylated compound to react with thioureas, pyridine, trialkylamine, etc. to convert it to the isothiuronium salt, pyridinium salt, quaternary ammonium salt, etc., respectively.

It has also been known to produce chemicals like dye stuffs by water-solubilizing in the same manner as above various polycyclic compounds such as naphthalene, anthracene, etc.

However, the abovementioned compounds exhibits only a weak function of flocculating solid particles suspending in water or organic substances dissolved in water, hence they have been less useful as flocculating agents.

SUMMARY OF THE INVENTION

It is therefore the primary object of the present invention to provide a new water-soluble substance having cationic surface active properties having an excellent flocculating effect.

It is the secondary object of the present invention to provide a method for producing such substance from a material containing various organic compounds having condensed aromatic structure.

It is the tertiary object of the present invention to provide flocculating method, in which the abovementioned water-soluble cationic surface active substance is utilized.

The foregoing objects of the present invention will become more apparent from the following detailed description of the invention with reference to preferred embodiments thereof.

DETAILED DESCRIPTION OF THE INVENTION

1. Material to be used

The material for use in the present invention is a tarry, pitchy, or resinous substance to be produced at the time of heat-treating coal tars, or petroleums such as crude oil, naphtha, kerosene oil, fuel oil, pyrolysed oil, etc. at a temperature range of from 700°C to 2,000°C for a short period of time of from one-tenth sec. to 1/1,000 sec. Coal tar and coal pitch may be used as the raw material without subjecting them to heat-treatment. It is also possible to use, as the raw material, a substance obtained by subjecting these tars and pitches to a further treatment such as partial hydrogenation, alkylation, etc.

The above-mentioned raw materials exist in the form of a mixture of various kinds of compounds. Although, in the present invention, certain specific distilled components of these materials may be used some tine, there is no possibility of using a specific single compound for the purpose of the present invention, but a mixture of various substances is necessarily used. In other words, the raw materials for the present invention cover very wide assortments of molecules depending on the kinds of condensed ring, number of the constituent rings, kinds of alkyl-substituent, and the number thereof, hence they have wide range of the molecular weight distribution.

Of these various raw materials, those to be used for the present invention are mixtures of high aromatic compounds having their molecular weight range of from 180 to 1,500 (as measured by vapor pressure osmometric method (V.P.O. method) utilizing nitrobenzene as a solvent), and H/C atomic ratio of from 1.3 to 0.4.

Coal tar, in some cases may be used as it is, since it has primarily high aromaticity. However, oils from petroleum is of low aromaticity, hence they cannot be used as they are for the purpose of the present invention. It can therefore be said that most of the raw materials for the present invention may first become satisfactory by the process of pyrolysis and recombination through the heat-treatment at a high temperature.

Although the reasons for the abovementioned lower limit of the mean molecular weight and the upper limit of the H/C atomic ratio are yet to be clarified, they have been found out empirically as the limit values capable of exhibiting the intended effect of the present invention. Also, the upper limit of the mean molecular weight and the lower limit of the H/C atomic ratio have been empirically established as the limit values to produce desired water-soluble salts.

2. Halomethylation

The above-described raw material is subjected to halomethylation, e.g., chloromethylation. No specific method is adopted, but an ordinary method meets the present purpose. For example, a halomethylation reaction of the raw material with hydrogen chloride and formaldehyde, or para-formaldehyde, or α-oxymethylene, a reaction with chloromethyl ether in the presence of Friedel-Kraft type catalyst, and so forth are employed. The chloromethyl group can be readily introduced into the raw material by reacting 100 g of the raw material with 4 to 10 mol % of the chloromethylating agent in an appropriate solvent. In this case, introduction of at least 1 chloromethyl group with respect to one unit of the condensed aromatic structure will be sufficient, the chlorine content being more than 20 percent by weight.

3. Quaternization

There is no specific method of reacting the halomethylated intermediate product with amines such as thiourea, etc.. It may be carried out by directly adding the amines to the above-mentioned reaction mixture for the halomethylation, or by dissolving the amines into an appropriate organic solvent for the reaction.

The amines suitable for this treatment are: thiourea, alkyl thiourea, phenyl thiourea; pyridines such as pyridine, picoline, quinoline etc.; trialkyl amines such as dimethylbenzyl amine, dimethyllauryl amine, etc.; and Schiff bases.

The water-soluble cationic salts of isothiuronium type, pyridine type, quaternary ammonium type, etc. thus produced are liver-colored solid and dissolve well in water and methanol, but are insoluble in other organic solvents. The aqueous solution of the salt is cationic, and possesses cationic surface active properties.

There are some cases where a perfect aqueous solution cannot be obtained and precipitation occurs. These cases are: (1) when the mean molecular weight of the raw material is especially large; (2) when the molecular weight thereof becomes exceedingly large by polycondensation of the reactants as the side-reaction at the time of the halomethylation reaction, and when the quantity of introduction of amino group is small. In such cases, the insoluble component may be eliminated by filtration, or it may remain in the aqueous solution for use as the flocculating agent.

In summary, the characteristic of the present invention resides in the manufacture of a novel hydrophilic substance by introducing the amino group into a particular raw material containing therein many kinds of molecules. The cationic surface active agent thus obtained has in general a mean molecular weight of from about 300 to 5,000.

When the aromatic compounds such as alkyl benzene, naphthalene, anthracene, etc. are each subjected to the halomethylation and the subsequent quaternization (isothiuroniumnization) to render the same into water-soluble cationic type compounds, these individual compounds do not exhibit the flocculation function to any appreciable degree. However, in the present invention where a mixture of polycyclic condensation compounds is used as the raw material, compounds having excellent flocculating properties can be obtained, whereby particles of organic as well as inorganic substances suspending in water can be flocculated and collected by sedimentation or floatation. Moreover, as the material is obtainable at low industrial cost, the merit of the modified compound is very remarkable.

4. Flocculation with the water-soluble cationic surface active substance

As stated in the foregoing, the water-soluble cationic surface active substance of the present invention is useful as a flocculating agent.

There has generally been employed linear high polymers such as polyacrylamide, etc. in various methods for clearing river water, rain water, sewage water, drainage water, sludge, and slurry, etc. by flocculating and segregating solid particles contained therein or organic substances dissolved therein. This method, however, exhibits or does not exhibit its flocculation effect according to the kinds of solid particles to be flocculated. In particular, there has so far been no effective way of clearing suspension containing inorganic substances like drainage water after cleaning sands and gravels, or suspension containing organic sustances like sewerage water.

However, when the water-soluble cationic surface active substance of the present invention is used, it has been found out that flocculation of solid particles from these waters, to which the conventional method is less effective, can be carried out quite easily. The method of flocculation with this substance will now be explained hereinbelow.

The cationic surface active substance according to the present invention is added to a suspension or solution to be treated separately or simultaneously with a conventional hydrophilic high polymer flocculating agent, thereby coalescing solid particles suspending and/or substances dissolved in the liquid to be treated. Thus, the addition of the cationic surface active substance of the present invention along with the conventional flocculating agent is not only far more effective in its flocculation than in the case wherein the only conventional flocculating agent is used, but also is capable of treating any kind of liquid containing various sorts of suspended or dissolved substances.

The quantity of addition of the cationic surface active substance according to the present invention is not so limitative. That is, it can be added as it is, but, it is usually preferable to prepare a 1 percent stock-solution of this substance, which is then added to liquid to be treated in an amount of from 10 to 100 ppm in terms of the pure component.

For the conventional water-soluble macro-molecular flocculating agent to be used along with the water-soluble cationic surface active substance of the present invention, linear high polymer products of cationic, anionic, or nonionic type are usually used. Any of these three types of the agents will meet the purpose, but, from the standpoint of electric charge, anionic or nonionic types are particularly preferable. The mean molecular weight of the substance is more than 1,000,000. The upper limit of the mean molecular weight is indeterminable, and any kind of substance above this lower limit is useful, if it is only water-soluble.

Examples of the anionic water-soluble high polymer acid and its salt are as follows: hydrolyzed products of polyacryl amide; anionized products of polyacryl amide or polyacrylonitrile; and so forth.

Example of the nonionic water-soluble high polymer for this purpose is polyacryl amide, etc.

Examples of the cationic water-soluble high polymer for this purpose are polyethylene imine, cationized products of polyacryl amide, etc.

These high polymers are made into an aqueous solution of about 1 percent concentration, which is usually added to the liquid to be treated subsequent to the addition of the cationic surface active substance of the present invention. In some cases, both substances may be added simultaneously to the liquid to be treated. However, no flocculation effect can be obtained, if the conventional high polymer is added to the liquid to be treated prior to the addition of the cationic surface active agent according to the present invention.

From 0.1 to 10 ppm in terms of the pure component of this high polymer flocculating agent is added to the liquid to be treated together with the cationic surface active substance of this invention in the manner as mentioned in the foregoing, and then the liquid to be treated is agitated for perfect mixing of the flocculating agents and the liquid so as to coalesce the solid particles, and finally the solid components thus grown are separated by sedimentation, floatation, filtration, and other means, thereby cleaning the liquid to be treated. The flocks of the grown solid particles are sufficiently large to be easily separated by sedimentation or floatation, and are also easily dehydrated by filtration.

When the cationic or nonionic type substance is used as the water-soluble high polymer flocculating agent, both type of agents are mixed together beforehand and added to the liquid to be treated subsequent to addition of the cationic surface active substance of the present invention, or they can be individually added.

PREFERRED EMBODIMENTS

In order to enable skilled artisans in this field of technology to reduce the present invention into practice, the following examples are presented. It should, however, be noted that the present invention is not limited to these examples alone.

EXAMPLE 1

Crude oil of Seria origin was preheated to 300°C and then atomized into steam heated to 1,800°C for heat-treatment in a very short period of 0.005 second. A tarry substance obtained from the heat-treatment was distilled to a temperature of 250°C under a reduced pressure of 5 mm Hg, thereby obtaining a pitchy residue.

It was recognized from various measurements such as infrared spectrum, NMR spectrum, molecular weight, molecular weight distribution, elementary analyses, and X-ray diffraction that the resultant pitchy substance was a mixture of compounds having very wide range of molecular weight distribution representable by a model structure, wherein 4 to 5 units of polycyclic aromatic condensation structures each having in average four to five aromatic rings are jointed to constitute the basic skeleton, with which several numbers of the alkyl radical are coupled. The mixture had its mean molecular weight of approximately 800, and H/C atomic ratio of 0.52.

100g of this pitch material was charged into a three-neck flask of 1-liter capacity together with 400g of di-chloroethane, 250 g of para-formaldehyde, and 30g of zinc chloride (Zn $Cl_2$), and agitated for 8 hours at 70°C, while adding thereto hydrogen chloride gas (HCL) at the rate of supply of 36 g/hour. The reaction mixture was filtered, and then 1,000g of dichloroethane and 50g of thiourea were added to the filtered liquid. After the batch was agitated for 2 hours at 50°C, the deposited substance was separated by filtration and dried, whereby 110 g of liver-colored solid substance was obtained. This solid substance was verified as isothiuronium salt through infrared spectrum and elementary analyses, etc. This substance is designated as specimen A. As the comparative examples, isothiuronium salt was manufactured from chloro-methylated benzene and chloro-methylated dodecylbenzene, respectively, and designated as specimens B and C.

A suspension prepared by dispersing 5 g of kaolin into 100 cc of water was poured into three cylinders of 30 cm deep each, into which the abovementioned specimen isothiuronium salts A, B, and C were respectively added at the ratio of 0.01 percent with respect to water, and the conditions of flocculation and sedimentation were compared among the three. The following Table 1 shows the comparative results of the rate of lowering of the interface between the clear liquid and the kaolin suspension layer, from which it is clear that the flocculation of the present invention is remarkably effective.

TABLE 1

| Specimen | Blank | Invention A | Comparative Samples B | C |
|---|---|---|---|---|
| Rate of lowering (cul/min.) | 1.24 | 4.03 | 1.15 | 1.73 |

EXAMPLE 2

Tarry substance obtained by cracking of naphtha at distilled under a reduced pressure of 5 mm Hg to obtain a distilled component having the boiling point of 180°–250°C, mean molecular weight of about 300, and H/C atomic ratio of 0.83. As the results of various measurements such as infrared spectrum, ultra violet spectrum, NMR spectrum, elementary analysis, molecular weight, molecular weight distribution, etc., this distilled component was recognized to be a mixture containing a number of compounds, in which the alkyl group is coupled with three to four units in average of polycylic aromatic condensation structures.

200 g of dichloro-ethane, 700 g of chloromethyl ether, and 20g of $ZnCl_2$ were charged into a three-neck flask of 1-liter capacity, of which 100 g of the above-mentioned distilled component is added, and reacted for 4 hours at 50°C, while agitating the mixture. Thereafter, the batch was filtered, and then the filtered liquid was added to 2,000 cc of methanol to precipitate the chloromethylated substance. The weight of the substance after drying was approximately 100 g.

This chloro-methylated substance was dissolved in 300 g of tetrahydrofuran, to which 45 g of thiourea was added, and the batch was agitated for 2 hours at 50°C. One hundred and forty g of liver-colored solid substance was obtained after filtration and drying.

By infrared spectrum, elementary analysis, etc., this solid substance was verified as isothiuronium salt and was designated as specimen D. As a comparative specimen, butyl naphthalene as a raw material was chloromethylated and then isothiuroniumnized by diethyl thiourea. This substance was designated as specimen E.

Same as in Example 1 above, comparison was made between D and E as to the flocculation and sedimentation effect, the results of which are as follows.

TABLE 2

| | Invention | Comparative Sample |
|---|---|---|
| Specimen | D | E |
| Rate of Drop (cul/min.) | 4.24 | 2.03 |

EXAMPLE 3

Coal tar (product of Tokyo Gas Co., Japan) available in market was distilled at 250°C under reduce pressure of 3 mm Hg, and a pitch was obtained as a residue. As the result of the same analysis in Example 1 above, this pitch was verified as a mixture of various compound molecules having a structure of polycyclic condensation containing four to five rings in average and alkyl side-chain in combination, and having mean molecular weight of about 410, and H/C atomic ratio of 0.61.

With this substance as the raw material, a water-soluble salt of pyridinium type was obtained by chloromethylation and further reaction with picoline under the same reaction conditions as in Example 1.

The product thus obtained was measured for its rate of lowering in the kaolin suspension under the same condition as in Example 1. An excellent result of 3.89 cul/min. was recognized.

EXAMPLE 4

From crude oil of Seria origin, pitch residue was obtained in the same manner as in Example 1. This pitch was treated in the same manner as in Example 1 thereby obtaining isothiuronium salt (specimen A).

Further, the pitch was reacted with pyridine to obtain pyridinium salt *specimen B), and then it was also reacted with $\alpha$- picoline to obtain $\alpha$-pecoline salt (specimen C).

Also, in the same manner as in Example 2, a tarry substance obtained by flame-cracking of naphtha was distilled to obtain a distilled component having the boiling point of 180°–250°C, mean molecular weight of about 300, and H/C atomic ratio of 0.83. This distilled component was similarly chloromethylated, and quartenized to be turned into isothiuronium salt (specimen D). In the same manner, specimen E *urotropine salt), specimen F (trimethyl amine salt), specimen G (triethanol amine salt) were produced.

Two hundred cc of discharge water for cleaning macadams and gravels having turbidity of 14,000 was filled in a settling tube of 450 mm in height, to which 40 ppm of the specimens A to G were added and the mixture was agitated. Subsequently, 15 percent hydrolyzed substance of polyacryl amide having molecular weight of 5,000,000 or so (specimen H) was added to the mixture in an amount of 0.4 ppm, and the mixture was further agitated for 1 minute by rotation at a rate of 6 rpm, and then turning the settling tube up-side-down to keep it stationary for 10 minutes. Thereafter, the turbidity of the supernatant water was measured, the results being as shown in Table 4 below.

TABLE 4

| Specimen | Turbidity of Supernatant Water | Turbidity in case Hydrolized substance of Acryl amide is not added |
| --- | --- | --- |
| A | 51 | 1300 |
| B | 161 | 4850 |
| C | 108 | 2535 |
| D | 130 | 1290 |
| E | 225 | 2600 |
| F | 63 | 1410 |
| G | 153 | 4600 |

(NOTE: Turbidity is 1000, when 0.4 ppm of the hydrolyzed substance of acryl amide is individually added.)

The following Table 5 indicates the results of sedimentation test by adding 40 ppm of a mixture of polyacryl amide (molecular weight: 5,000,000 or so) and the aforementioned water-soluble high polymer flocculating agent (specimen N) as well the cationized product of polyacryl amide (molecular weight: 4,000,000 or so) and the water-soluble high polymer flocculating agent (specimen K).

Table 5

| Specimen | Mixing Ratio | Turbidity of Supernatant Water |
| --- | --- | --- |
| A + N | 8 : 2 | 54 |
| A + K | 9 : 1 | 99 |
| D + N | 9 : 1 | 45 |
| D + K | 9 : 1 | 67 |
| C + K | 9 ; 1 | 117 |

The following Table 6 shows the results of turbidity test of supernatant water, when 500 cc of city sewerage having a turbidity of 50 was added with 40 ppm of the specimen A, while agitating the mixture by a jar tester, followed by separate addition of 1 ppm of the speciens H, N, and K respectively, and vigorous agitation of the mixture is carried out for 2 minutes and mild agitation followed for 5 minutes. After 10 minutes recess, the supernatant water and the individual specimens were tested for turbidity.

Table 6

| Specimen | Turbidity of Supernatant Water |
| --- | --- |
| A + H | 6.8 |
| A + N | 6.3 |
| A + K | 8.2 |
| A | 11.5 |
| H | 21.0 |
| N | 19.0 |
| K | 19.5 |

What we claim is:

1. A water-soluble cationic surface active substance manufactured by subjecting to halomethylation a mixture of high aromatic hydrogen compounds selected from the group consisting of tarry, pitchy and resinous substances obtained by heat-treating a substance selected from the group consisting of petroleum type hydrocarbons, coal tar and coal pitch at a temperature range of from 700°C to 2,000°C for a time period of from one-tenth second to 1/1,000 second, and further subjecting the halomethylated product to subsequent quaternization by adding thereto an amino compound selected from the group consisting of thioureas, trialkylamines and pyridines, said high aromatic hydrogen compounds containing therein, as the principal constituent thereof, skeletons composed of a polycyclic condensation structure having at least two aromatic rings consisting essentially of carbon and hydrogen with or without an alkyl radical attached to the rings, and having a mean molecular weight of from 180 to 1,500 and a hydrogen/carbon atomic ratio (H/C) of from 0.4 to 1.3.

2. A water-soluble cationic surface active substance according to claim 1, wherein said quaternization is carried out by adding a thiourea compound to the halomethylated product, said thiourea compound being selected from the group consisting of thiourea, alkylthiourea and phenyl thiourea, thereby converting the halomethylated compounds to the isothiuronium salts thereof.

3. A method for producing a water-soluble cationic surface active substance which comprises:
   a. introducing a halomethyl radical into a raw material which is a mixture of a plurality of high aromatic hydrogen compounds selected from the group consisting of tarry, pitchy and resinous substances obtained by heat-treating a substance selected from the group consisting of petroleum type hydrocarbons, coal tar and coal pitch at a temperature range of from 700°C to 2,000°C for a time period of from one-tenth second to 1/1000 second, said high aromatic hydrogen compounds containing therein, as the principal constituent thereof, skeletons composed of a polycyclic condensation structure having at least two aromatic rings consisting essentially of carbon and hydrogen atoms with or without an alkyl radical attached to the rings, and having a mean molecular weight of from 180 to 1,500 and a hydrogen/carbon atomic ratio (H/C) of from 0.4 to 1.3, and
   b. reacting the halomethylated compounds with a compound selected from the group consisting of thioureas, trialkylamines and pyridines to convert the halomethylated compounds to the quaternary salts thereof.

4. A method according to claim 3, wherein the quaternization is carried out by reacting the halomethylated compounds with a thiourea compound selected from the group consisting of thiourea, alkylthiourea and phenyl thiourea to convert the halomethylated compounds to the isothiuronium salts thereof.

* * * * *

UNITED STATES PATENT OFFICE
CERTIFICATE OF CORRECTION

Patent No. 3,720,624       Dated  March 13, 1973

Inventor(s) Shigeyuki Suzuki, Kotara Kumakoto, Isamu Kaneda and Shoushiro Sakai

It is certified that error appears in the above-identified patent and that said Letters Patent are hereby corrected as shown below:

Page 1, column 1, section [73] Assignee, change to the following:

-- [73]  Assignee:  Kurita Water Industries Limited, one-half part interest, Koraibashi, Higashi-ku, Osaka-shi, Osaka-fu, Japan Kureha Kagaku Kogyo Kabushiki Kaisha, one-half part interest, Nihonbashi Horidome-Cho, Chuo-Ku, Tokyo-To, Japan --.

Signed and sealed this 17th day of September 1974.

(SEAL)
Attest:

McCOY M. GIBSON JR.
Attesting Officer

C. MARSHALL DANN
Commissioner of Patents